Jan. 14, 1964   R. F. CREASEY ETAL   3,117,747
VERTICAL TAKE-OFF AIRCRAFT
Filed Oct. 30, 1961   3 Sheets-Sheet 1

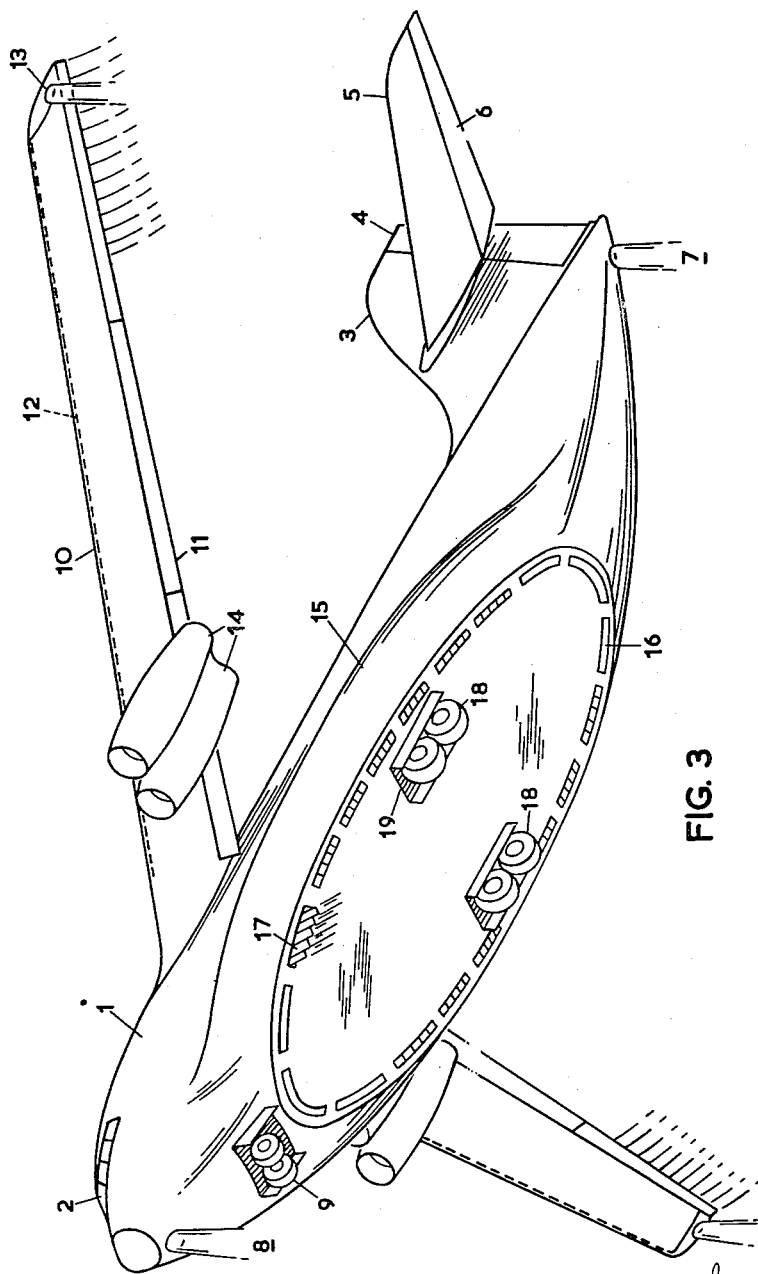

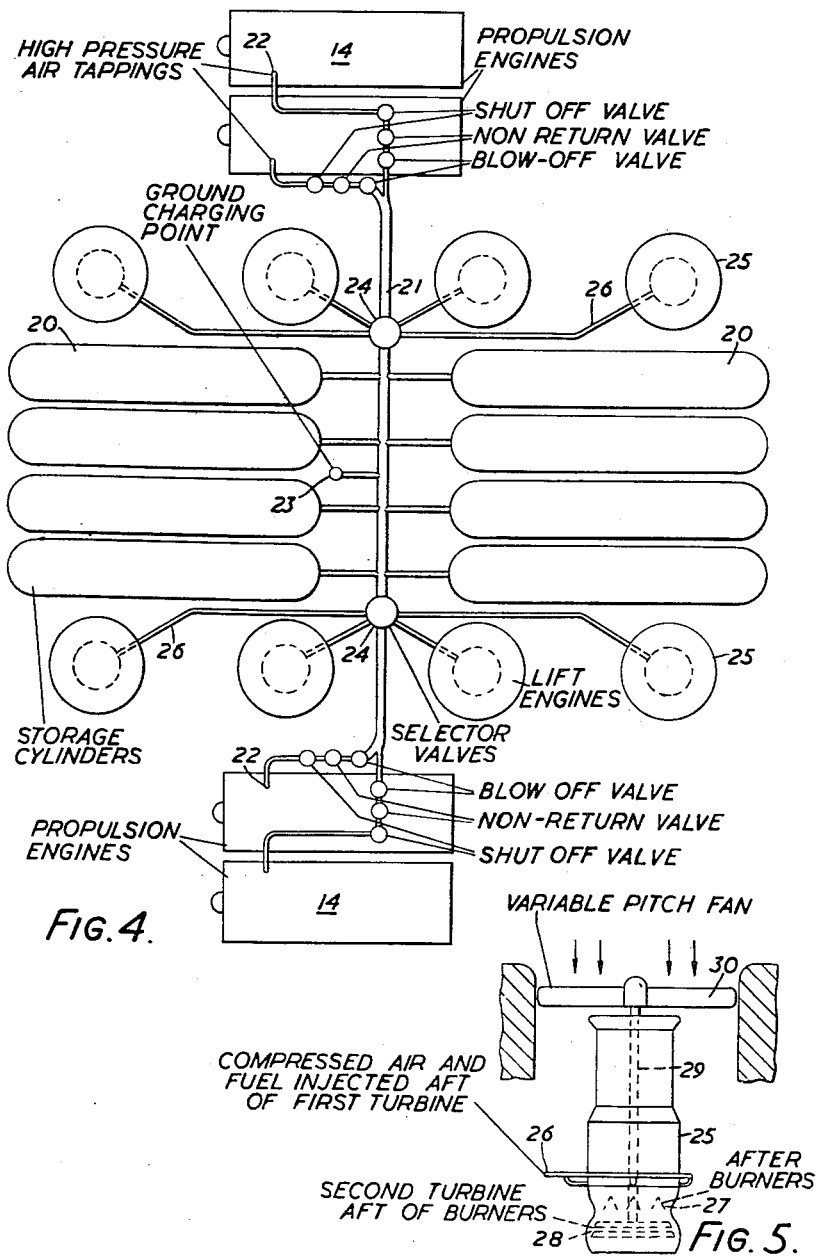

United States Patent Office
3,117,747
Patented Jan. 14, 1964

3,117,747
VERTICAL TAKE-OFF AIRCRAFT
Raymond Frederick Creasey, Lytham St. Annes, Gerald David Walley, Freckleton, and Frank Gerrie Willox, Lytham St. Annes, England, assignors to The English Electric Company Limited, London, England, a British company
Filed Oct. 30, 1961, Ser. No. 148,540
Claims priority, application Great Britain Nov. 18, 1960
2 Claims. (Cl. 244—12)

The present invention relates to an aircraft capable of lifting itself clear of the ground from standstill or at a speed below wingborne speed and of accelerating to wingborne speed while off the ground. It can therefore be considered a vertical take-off aircraft although its installed vertical thrust is less than the weight of the aircraft, as distinguished from known vertical take-off aircraft capable of sustained flight below wingborne speed.

The aircraft according to the present invention is also distinguished from so-called hovercraft using the ground effect of a peripheral jet emerging from the base of the craft for increasing, beyond the ambient pressure, the pressure acting on said base enclosed by a jet curtain and thus to support itself at a low height above ground by a thrust smaller than the weight of the craft. However the height at which such hovercraft can sustain themselves by the said ground effect is in strict relationship to the area enclosed by the said jet curtain, so that such area has to be large if the height at which the craft can hover is to be of practically sufficient magnitude.

According to the present invention a vertical thrust of a magnitude below the weight of the aircraft but exceeding the thrust required for hovering steadily close to the ground is applied to the aircraft by means of a peripheral jet curtain which enables the aircraft to leap above the steady hover height, and at the same time a forward thrust is applied to the aircraft which is thus capable of acquiring wingborne speed while off the ground.

At the top of the aforesaid leap the aircraft should be wingborne. The time taken for the leap is determined by the vertical motion, and the horizontal speed required for wingborne flight at the top of the leap determines the horizontal acceleration required. If the installed vertical thrust is to be kept at a minimum, the speed required for wingborne flight is to be reduced to the lowest possible value by the use of high lift devices such as jet flaps. However, jet flaps are less efficient near the ground and hence the height of the leap and the corresponding vertical thrust should not be too low, but the latter may be substantially less than the weight of the aircraft.

Higher take-off weights may be attained by using a very short ground run before starting the leap, thus adding aerofoil lift to the vertical thrust of the peripheral air curtain.

Alternatively the ground effect may be used as in a hovercraft to replace the conventional undercarriage and to support the aircraft during take-off over comparatively long flat surfaces which however need not be strengthened by concreting.

Likewise vertical thrust is applied by the peripheral jet curtain on landing whereby the actual landing speed can be kept below the wingborne speed. Even large and heavy jet propelled aircraft can thus take off from and alight on grassy surfaces of moderate length as distinguished from the very long and strong concrete runways hitherto required for such aircraft.

In order that the invention may be clearly understood and readily carried into effect the same will now be described by way of example with reference to the accompanying drawings, in which:

FIG. 3 is a diagrammatic perspective view from below of an aircraft according to the present invention.

FIG. 4 is a diagrammatic plan view of stored energy means.

FIG. 5 is a diagrammatic elevation, partly in section, of a lift engine for use with said stored energy means.

Figure 1:
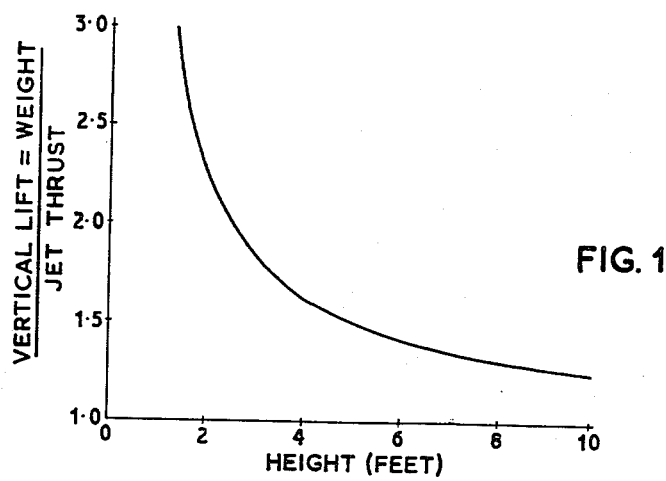
FIG. 1 is a graph plotting the ratio of vertical lift jet thrust to the weight of a craft against the steady hover height (in feet) for a given plan form and area.

Referring firstly to FIG. 1 the aerodynamic effect of ground on total lift for steady hover flight is shown to be substantial only at low height and to decline rapidly with increasing height. This ground effect is directly proportional to the area of the enclosed jet curtain, which has accordingly to be large in order to attain any practically usable height of steady hover flight.

Figure 2:
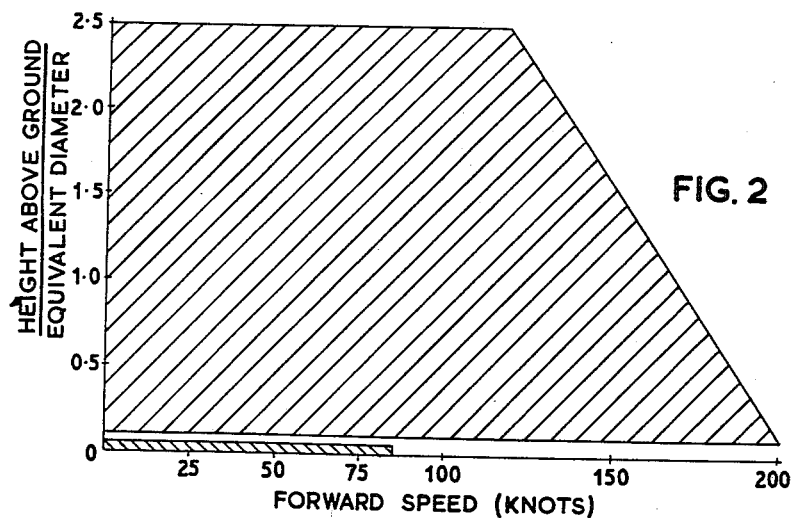
FIG. 2 is a graph plotting the ratio of height above ground to the equivalent diameter of the jet curtain against the forward speed (in knots) for a known hovercraft and for an aircraft according to the present invention taking off by a leap combined with forward acceleration to wingborne speed, respectively.

FIG. 2 shows that for a conventional hovercraft the ratio of height above ground to equivalent diameter of the area enclosed by the jet curtain (ordinate) is very low regardless of forward speed (abscissae) while for a leap take-off aircraft according to the present invention the said ordinate is a high multiple of that for the hovercraft for forward speeds sufficient for the aircraft to become wingborne at the top of the leap with the use of suitable high lift devices.

Referring now to FIG. 3, a fuselage 1 has a crew cockpit 2, a dorsal fin 3 and rudder 4 and a high slung tailplane 5 and elevator 6. Vertical jet nozzles 7 and 8 are provided at the tail end and nose end, respectively, of the fuselage for pitch control below wingborne speed. A wing 10 has full span trailing edge flaps 11, if desired divided into spanwise sections, for high lift deflection and roll control at wingborne speed, respectively. A full span slot 12 just above the leading edge of the wing 10 is provided as a high lift device for blowing air over the top surface of the wing. Downward directed jet nozzles 13 are provided at the wing tip for roll control below wingborne speed. Propulsive jet engines are mounted in underslung nacelles 14.

A fairing 15 on the underside of the fuselage 1 encloses a downward jet curtain composed of discrete nozzles 16, the side nozzles being provided with deflector vanes 17 for producing a forward or reverse thrust component.

The aircraft rests on the ground on a retractable nose wheel 8 and main undercarriage 18. Means for blowing cold air through slots 19 prevent overheating of the tyres whilst the undercarriage is lowered and the jet curtain is in use.

It is obvious that the configuration of the aircraft illustrated is only given by way of example, and that other configurations such as a canard type or a delta-wing could be used. In the latter case the jet curtain nozzles 16 may be arranged along the delta-contour of the wing.

Stored energy, for example in the form of compressed gas to be released through the nozzles 16, may be used to give an additional initial vertical thrust.

In FIG. 4, storage cylinders 20 are connected in parallel to a manifold 21 leading to high pressure tappings 22 of the compressors of the propulsion engines 14 with the usual shut-off valves, non-return valves and blow-off valves interposed. Compressed air is stored in the cylinders 20 in level flight. A ground charging point 23 is also provided.

Through selector valves 24 controlled by the pilot the lift engines 25 producing in operation the gaseous jets emerging from the nozzles 16, 17 (FIG. 3) can be connected to said manifold 21 by means of compressed air pipes 26 (FIG. 4) serving for the injection of fuel to after-burners 27 (FIG. 5) arranged aft of the first turbine (not shown in detail) of said lift engines 25 in order to supply propulsive gases to a second turbine 28 aft of the burners 27 and driving through a central shaft 29 a variable pitch fan, whose pitch is increased for the leap, when stored energy is applied.

What we claim as our invention and desire to secure by Letters Patent is:

1. An aeroplane capable of lifting itself clear of the ground at a speed below wingborne speed and of accelerating to wingborne speed while off the ground comprising in combination: a fuselage, an aeroplane wing mounted on said fuselage, gas jet generating means arranged on the underside of said fuselage for producing a peripheral gas curtain of a thrust of a magnitude below the weight of said aeroplane but exceeding the thrust required for steadily hovering close to the ground owing to the ground effect of the gas cushion enclosed by said gas curtain, and enabling said aircraft to leap above said steady hovering height, propulsive means having at least a forward thrust component accelerating said aeroplane to wingborne speed, and energy storage means in operation coupled to said gas generating means for producing an increased vertical thrust for take-off.

2. An aeroplane as claimed in claim 1, wherein the said energy storage means is a reservoir containing a compressed gas, and comprising nozzles downwardly discharging said gas for the formation of said peripheral gas curtain.

References Cited in the file of this patent

UNITED STATES PATENTS 3,070,327     Dornier _____ Dec. 25, 1962

FOREIGN PATENTS 219,133     Australia _____ Nov. 24, 1958